United States Patent [19]

Daifotes

[11] Patent Number: 4,751,368
[45] Date of Patent: Jun. 14, 1988

[54] FOOD WARMING DEVICE

[76] Inventor: Theodore S. Daifotes, P.O. Box 383, Oak Hill Acres, Tuolumne, Calif. 95379

[21] Appl. No.: 931,542

[22] Filed: Nov. 17, 1986

[51] Int. Cl.[4] .............................................. F27D 27/00
[52] U.S. Cl. .................................. 219/432; 219/452; 219/451; 219/435
[58] Field of Search ............... 219/432, 433, 386, 447, 219/452, 438, 442, 451, 452, 435, 436

[56] References Cited

U.S. PATENT DOCUMENTS

| 3,140,389 | 7/1964 | Windes | 219/447 |
|---|---|---|---|
| 3,586,824 | 6/1971 | Barney | 219/452 |
| 3,784,787 | 1/1974 | Shevlin | 219/386 |
| 4,307,287 | 12/1981 | Weiss | 219/442 |
| 4,399,351 | 8/1983 | Koff | 219/433 |
| 4,493,978 | 1/1985 | Starnes | 219/438 |
| 4,523,083 | 6/1985 | Hamilton | 219/433 |

*Primary Examiner*—E. A. Goldberg
*Assistant Examiner*—Marvin M. Lateef
*Attorney, Agent, or Firm*—Flehr, Hohbach, Test, Albritton & Herbert

[57] ABSTRACT

A food warming device (21) in which a plate (22, 22a) has an electrical resistance heating element (26, 26a) mounted to a bottom wall (24, 24a) thereof and an electrical switch (23) is mounted in a support surface (31) below the plate (22). The switch (23) includes a movable element (41) which is mounted for movement between a first position electrically coupling the switch (23) to terminal assembly (32, 32a) on the plate (22) and closing the switch (23) and a second position electrically uncoupling the switch (23) from the terminal (32) on the plate (22) and opening switch (23). The movable element (41) is preferably gravity biased toward the open position, and a magnet (44) is mounted to one of the plate (22) and the movable element (41) to displace the movable element (41) against gravity biasing from the second position to the first position when the plate (22) is placed on the support surface (31) proximate the switch (23). The terminal (32) on the plate (22) preferably includes a bimetallic strip (54) which acts as a contact member and current control device for regulation of the heat generated by the resistance heating element (26, 26a). A serving counter (81) incorporates the food warming device (21).

20 Claims, 3 Drawing Sheets

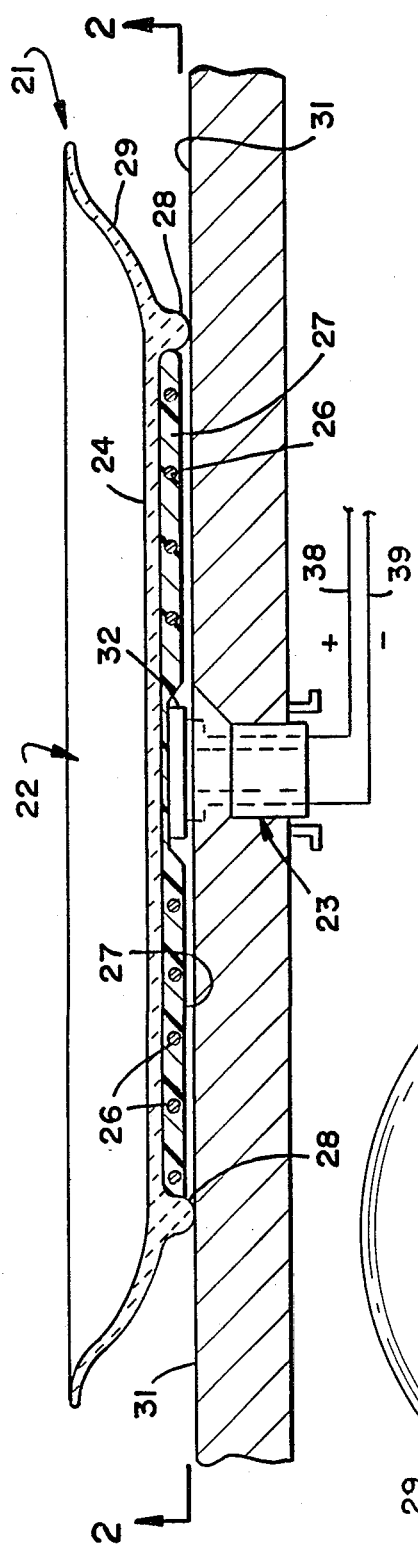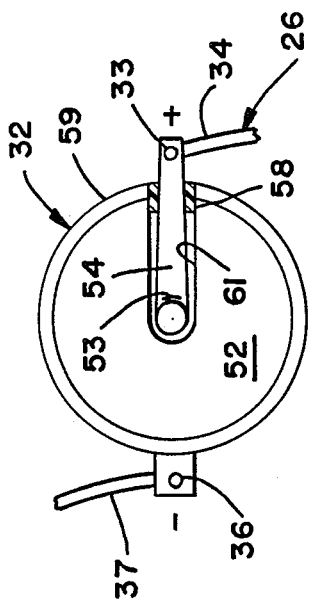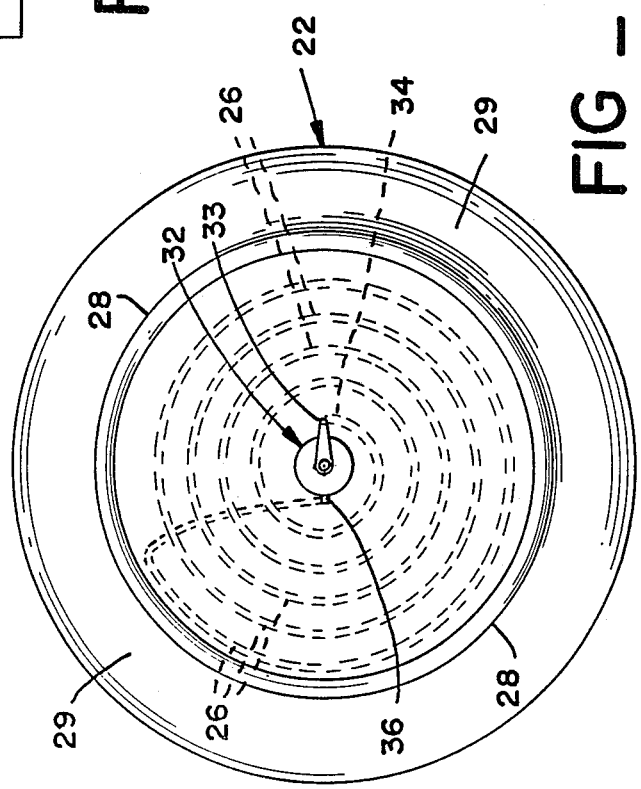

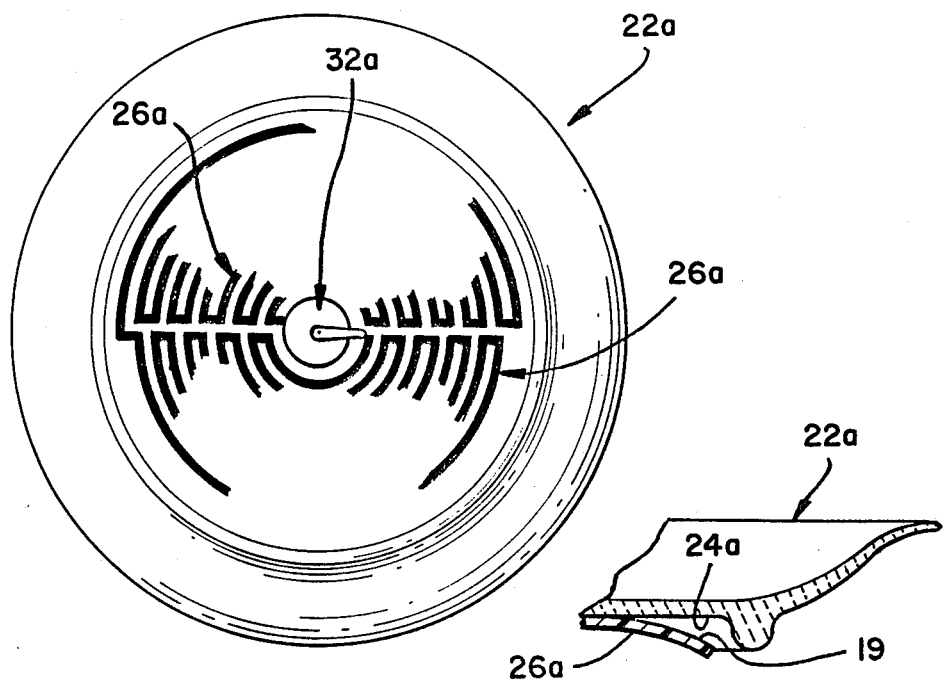
FIG _ 2A  FIG _ 2B
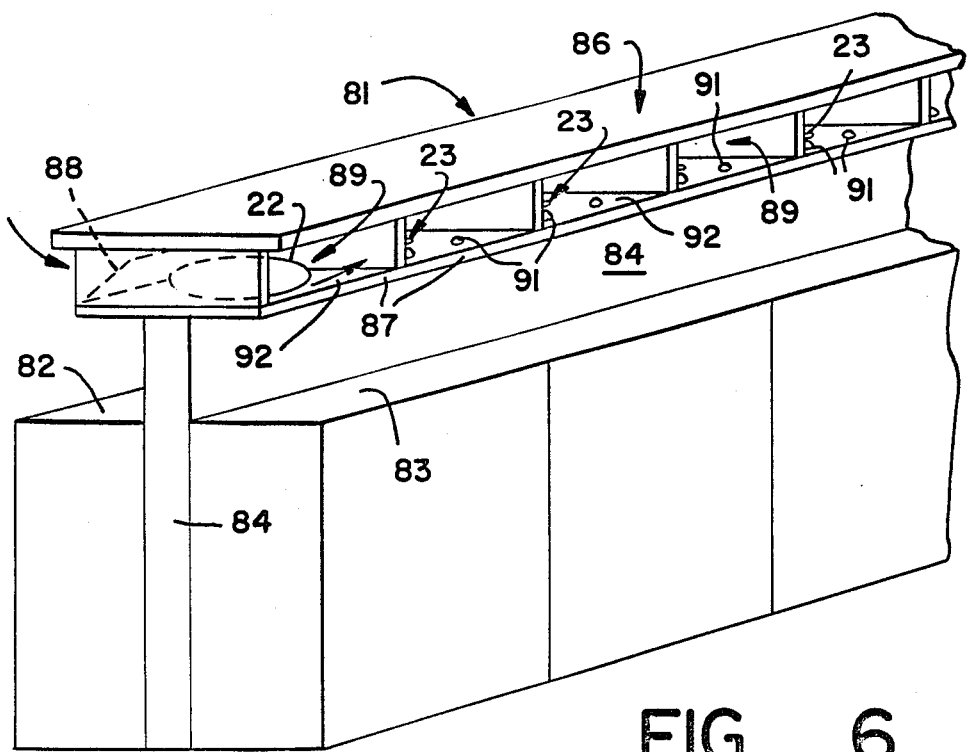
FIG _ 6

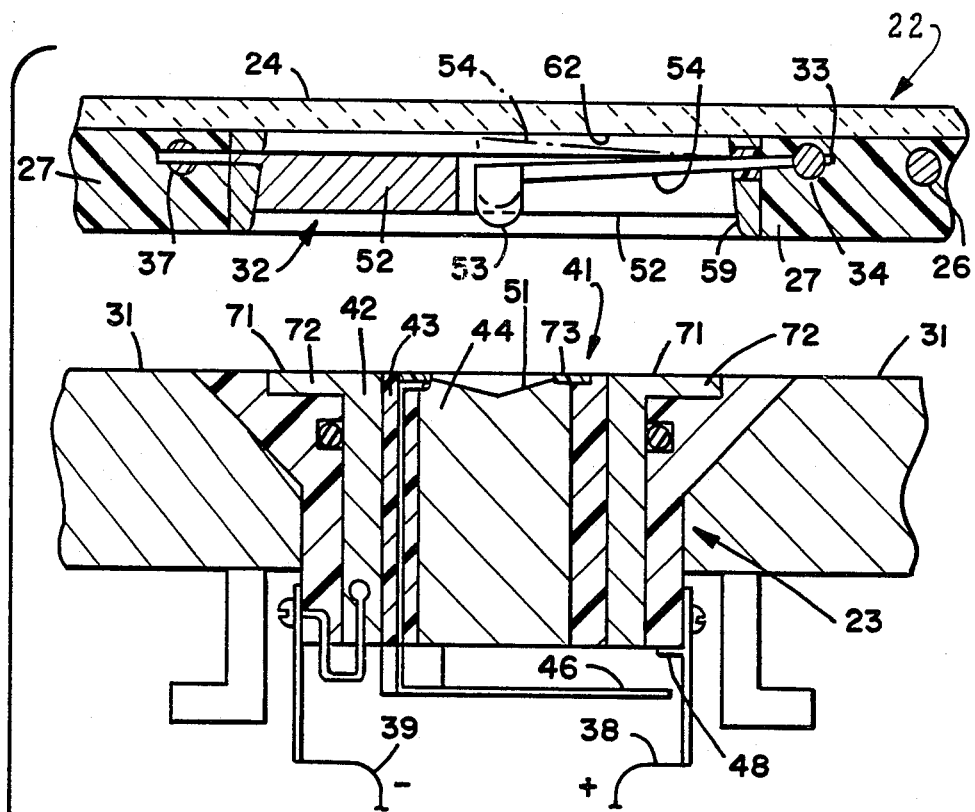
FIG_3
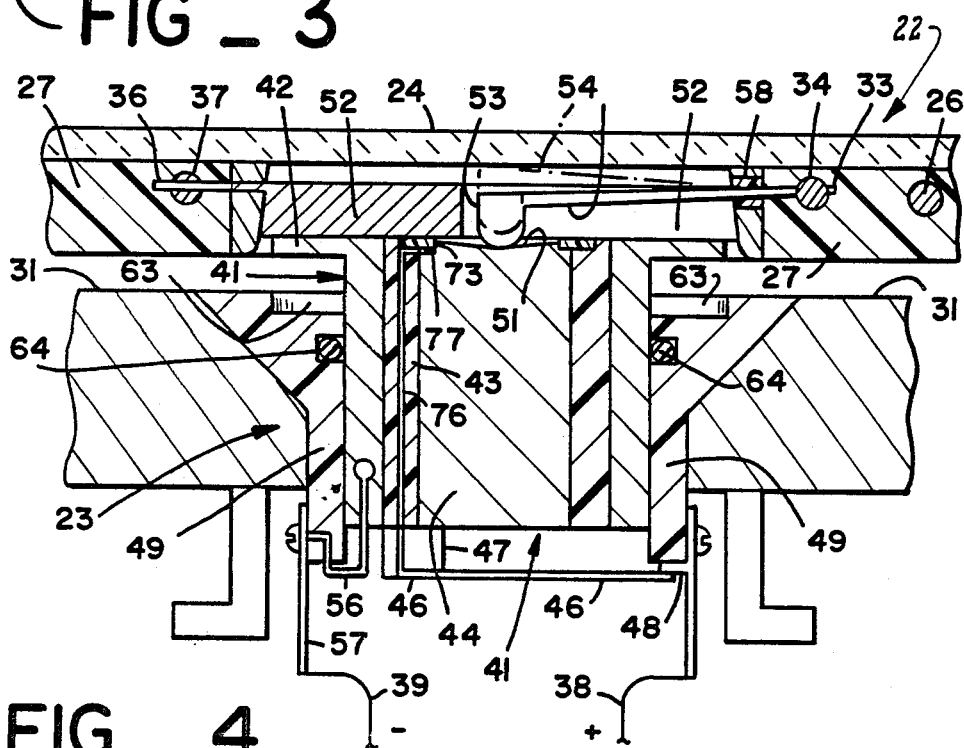
FIG_4

FOOD WARMING DEVICE

TECHNICAL FIELD

The present invention relates, in general, to food warming apparatus, and more particularly, relates to apparatus for maintaining food at an elevated temperature while the same is waiting to be served to the patron or is being consumed from a plate, tray, cup or other food container.

BACKGROUND ART

Both at home and at restaurants it is conventional for hot food to be served on a plate which has been warmed. There are various techniques for warming plates in the kitchen, including placing them in the oven, under a heat lamp, or in contact with an electrical resistance heating blanket. Typical of such resistance heating plate warmers, for example, is the device of U.S. Pat. No. 3,140,389.

While these techniques for maintaining food at an elevated temperature during consumption are effective at the start of a meal, they are of little assistance and relatively ineffective after only a short period of time. Convection and conduction heat transfer soon cool the mass of the serving dish or plate, as well as the food, with the result that the food temperature rapidly drops to ambient temperature during the course of a meal.

Several food warming devices have been developed which provide a constant source of heat for the food throughout the process of consuming the same. Typical of such apparatus are the food warmers of U.S. Pat. Nos. 3,586,824; 3,784,787; 4,493,978; and 4,523,083.

U.S. Pat. No. 3,586,824 discloses a food warming apparatus in which a heating element is mounted on a support surface or counter and a thermally conductive metallic plate is positioned immediately above and biased away from the heating element. When the user positions a dinner plate carrying food on the metal plate, the metal plate is displaced downwardly by the weight of the dinner plate and food against the heating element, and a switch is actuated to turn on the heating element. The heating element then warms the metallic plate, which in turn warms the plate on which the user's food is supported.

While this approach can be effective to warm food, it also inherently has certain safety problems. More particularly, such a plate warming device requires that the metallic plate be heated to a substantial temperature in order to transfer sufficient heat from the heating element to the metallic plate, from the metallic plate to the dinner plate and thereafter to the food. Moreover, when the plate on which the food was positioned is removed, the metallic plate moves away from the heating element, but it will remain at a substantial elevated temperature posing a burn hazard. Additionally, when the metallic heat transfer plate is in the up position, it is difficult to clean the counter or surface in which the plate warmer is positioned, and there is a likelihood that cleaning liquids will migrate into the area of the electrical components where corrosion, shorting or electrical shock can result.

The food heating and cooking apparatus of U.S. Pat. No. 3,784,787 employs a specially designed tray which receives mating casseroles. Each casserole is provided with an electrical heating element, which includes electrical terminals that are indexed with respect to terminals on the tray. Positioning of the casserole in the tray completes an electrically conductive circuit permitting heating. The system, however, is primarily designed to cook food inside a surrounding container and is not well suited for consumption of the food while positioned in the casserole on the tray. Moreover, such a plate warming system would not be well suited for use at a restaurant or coffee shop counter or table where liquids on the counter or table could cause shorting between the exposed terminals in the tray.

U.S. Pat. No. 4,493,978 discloses a serving dish which similarly is placed upon two exposed electrical contacts on a tray. The tray is constructed such that precise positioning of the serving dish on the contacts is not required in order to complete the electrical circuit, but the problem of spilled fluids shorting between the contacts on the tray still exists. Additionally, the special serving dish is constructed with metallic plates which are in close thermal contact with the heating element carried by the serving dish. When the serving dish is picked up off the tray, therefore, there is a burn hazard in connection with such plates.

A beverage warmer for heating beverages while in a cup or container is disclosed in U.S. Pat. No. 4,523,083. The beverage warming device has an electrical heating coil which is mounted on a tray or support surface on which the cup is placed. The device is switched on and off by a magnet carried by the cup and a reed switch mounted on the tray so that when the cup is placed in proximity to the reed switch, the heating coil is switched on. This approach, however, again results in a very hot surface when the cup or food container is removed from the surface which performs the heating.

It is desirable to be able to automatically control the temperature to which food is heated by food warming apparatus. U.S. Pat. Nos. 4,307,287 and 4,399,351 show typical food cooking apparatus which incorporate temperature control means which are mounted in contact with the bottom surface of the cooking appliance. Such controllers typically employ an intermittently operating switch which turns the electrical current on and off so as to maintain the appliance within a predetermined temperature range.

Accordingly, it is an object of the present invention to provide an automatic food warming device suitable for use in restaurants, coffee shops and the home by relatively inattentive users which food warmer is effective in maintaining the food at an elevated temperature during consumption and yet is very safe and trouble free in its operation.

Another object of the present invention is to provide a food warming device which may be easily cleaned with water or other conventional liquid cleaning agents without corroding the electrical components or creating a significant shock or short circuit hazard.

A further object of the present invention is to provide an electrical food warming device which will maintain food on a user's plate at an elevated temperature without posing a burn hazard to the user or to the person serving and removing the plates.

Another object of the present invention is to provide an electrical food warming device which can be used to maintain the food at an elevated temperature both while it is waiting to be served and while the user is consuming the food.

Still a further object of the present invention is to provide a food warming apparatus which can easily be retrofit into existing counters and table tops, is inexpensive to construct and operate, is very durable and relatively maintenance free, and automatically maintains food at a predetermined temperature.

The food warming device of the present invention has other objects and features of advantage which will become more apparent from and are set forth in more detail in the following description of the Best Mode of Carrying out the Invention and the accompanying drawing.

DISCLOSURE OF INVENTION

The food warming device of the present invention includes a food supporting plate having an electrical resistance heating element mounted thereto which is coupled to a contact terminal assembly carried by the plate. Additionally, the food warming device includes an electrical switch assembly coupled to a source of electricity and mounted proximate a support surface for the plate for communication of electricity to the heating element when the plate is positioned on the support surface proximate the switch.

The improvement in the food warming device of the present invention is comprised, briefly, of the switch being formed to include a movable element mounted for movement between a first position electrically coupling the switch to the terminal assembly and substantially simultaneously closing the switch for the flow of electricity to the heating element, and a second position electrically uncoupling the switch from the terminal assembly on the plate and substantially simultaneously opening the switch to prevent the flow of electricity therethrough. The movable element in the switch assembly is biased toward the second or open position, and the food warming device further includes magnet means mounted to one of the plate and the movable element and formed to displace the movable element against the biasing force from the second position to the first position when the plate is placed on the support surface proximate the switch.

Most preferably, the movable element is provided as a permanent magnet gravity biased away from the plate with the armature of the magnet being provided on the plate. Additionally, a bimetallic strip or cantilevered arm is preferably provided as one of the terminals on the plate so as to resiliently engage the switch when it moves into contact with the plate and automatically pull away from the switch when the bimetallic strip deflects under increasing plate temperature. The movable element is preferably flush with the support surface in which it is mounted to permit easy cleaning, and a recess and seal are provided to prevent the passage of water into the electrical components of the switch which are carried in the counter or support surface.

BRIEF DESCRIPTION OF THE DRAWING

FIG. 1 is a side elevation view, in cross-section, of a food warming device constructed in accordance with the present invention.

FIG. 2 is a bottom plan view, in slightly reduced scale, taken substantially along the plane of line 2—2 in FIG. 1.

FIG. 2A is a bottom plan view corresponding to FIG. 2 of a modified form of the plate of FIG. 2.

FIG. 2B is an enlarged, fragmentary, side elevation view, in cross section of the plate of FIG. 2A.

FIG. 3 is an enlarged, fragmentary, side elevation view, in cross section, of the switch assembly and contact terminal assembly portion of the plate warming device of FIG. 1, with the switch assembly shown in an open condition.

FIG. 4 is an enlarged, fragmentary, side elevation view, in cross section, corresponding to FIG. 3, with the switch assembly shown in a closed position.

FIG. 5 is an enlarged, bottom plan view taken substantially along the plane of line 5—5 in FIG. 1 and showing the contact terminal on the plate of the fluid warming device.

FIG. 6 is a fragmentary, top perspective view of a food service counter incorporating the food warming device of the present invention.

BEST MODE OF CARRYING OUT THE INVENTION

The food warming device of the present invention is particularly designed for use in restaurants in which it is predictable that relatively inattentive diners will be employing the apparatus and hurried waiters and waitresses must attend many customers. Thus, it must not pose a burn hazard of the type resulting when a heating coil is mounted in a counter or table top, and it must be easily cleaned by waiters and waitresses without any shock hazard or corrosion of the electrical components. Still further, such food warming apparatus must be easy to use and capable of retrofitting into existing counter and table surfaces. As will be appreciated, however, the same food warming device of the present invention can advantageously be employed in home applications.

Referring to FIG. 1, food warming device, generally designated 21, includes two major components, namely, plate means 22 and switch means 23. Plate means 22 can be a serving dish or another food container, such as a cup. Mounted beneath the transversely extending bottom 24 of plate 22 is an electrical resistance heating element 26, here shown as a coil (FIG. 2). As will be appreciated, a coil structure is particularly well suited for uniform heating of a round plate or dish 22, although resistance heating element 26 may also be provided in a generally rectangular array, which is particularly well suited for rectangular plates or containers. Such a rectangular configuration of a resistance heating element is shown, for example, in U.S. Pat. No. 4,523,083.

In order to effect efficient near transfer between heating element 26 and the bottom 24 of the plate means, the heating element may be mounted to bottom wall 24 by a potting compound or material 27 which can withstand the normal operating temperature of heating coil 26. EPOXY resins are particularly well suited for securement of coil 26 to wall 24. Additionally, it is preferable that the heating element be positioned inside the annular foot 28 conventionally provided on plates since waiters and waitresses normally grasp the annular lip or rim 29 of the plate.

Since plates are frequently broken during repetitive handling at restaurants, it is most preferable that the heating element be removably secured to bottom 24 of plate 22. As may be seen in FIGS. 2A and 2B, plate means 22a has a sheet-like etched-foil resistance heating element 26a secured to bottom 24a of the plate. Etched-foil resistance heater 26a can include a pressure-sensitive adhesive or bonding agent on side 19 of the heater. Thus, should plate 22a break, etched-foil heater 26a including terminal means 32a, can be peeled off the plate and installed on a new plate.

Etched-foil heating elements suitable for use in forming the assembly of the present invention are commercially available, for example, from Thermal Circuits, Inc., of Salem, Mass. under the trademark HEATSHEET.

Two substantial advantages accrue by positioning heating element 26 or 26a on the plate, instead of on support surface or counter 31. First, when the plate is removed from the support surface, there is no heating element or heated area which can burn the user or server. Second, bonding the heating element to the bottom of the plate greatly enhances heat transfer. Accordingly, the heating element can be operated at a lower temperature than a counter or support surface mounted heating element for any given temperature which the food is to be maintained.

For example, heating coil 26 or etched-foil heater 26a can be operated at approximately 138 degrees F. to maintain the food on plate 22 elevated to a temperature of about 132 degrees F. when the heating element is carried by the plate. By contrast, a heating element mounted on counter 31 would typically have to operate at about 240 to 260 degrees F. to maintain the same food temperature.

Also carried by plate 22 is terminal means, generally designated 32, which is electrically coupled to heating element 26 or 26a, for example, by connecting positive terminal 33 to one end 34 of coil 26 and connecting negative terminal 36 to an opposite end 37 of coil 26 (FIG. 5). The construction and operation of terminal means 32 on plate 22 will be described in more detail hereinafter.

The second major component of the food warming device of the present invention is electrical switch means 23 which is coupled by conductors 38 and 39 to a source of electricity (not shown). Switch means 23 is mounted proximate support surface 31 and formed for communication of electricity to heating element 26 or 26a when plate means 22 is positioned on the support surface proximate the switch assembly.

Prior art plate warming devices are broadly known which include a heating element carried by a plate or food container, and a switch assembly mounted in a support surface which contacts a plate-carried terminal for the communication of electricity to the heating element. Improvement in the food warming device of the present invention can best be understood by reference to FIGS. 3 and 4.

In order to effect communication of electrical current to heater 26 or 26a, switch means 23 includes a movable element, generally designated 41, which is here constructed as a plurality of concentric members 42, 43 and 44 that move together as a unit. Movable element 41 is mounted for movement between a first position shown in FIG. 4, and a second position shown in FIG. 3. In the first position switch means 23 is electrically coupled to terminal means 32 carried by the plate and switch means 23 has further been moved to a position closing the switch means for the flow of electricity therethrough. Thus, a first switch terminal 46, which is mounted by mounting bracket 47 to movable element 41 and cantilevered therefrom, is in contact or engagement with second switch terminal 48 on a stationary portion or member 49 of the switch means. Since electrical conductor 38 from the source of electricity is coupled to terminal 48, movement of movable element 41 to the position shown in FIG. 4 not only results in electrically conductive contact surface 51 at a first or upper end of movable element 41 coming into contact with terminal means 32 of the plate, but the switch terminal 46 at second or lower end of movable element 41 comes into contact with the second switch terminal 48 so as to close the electrical circuit through the switch and simultaneously close the electrical circuit from the switch to heating element 26 or 26a.

Movable element 41 is biased, preferably by gravity biasing, away from the first position of FIG. 4 to the second position shown in FIG. 3. As will be seen from FIG. 3, contact surface 51 on movable element 41 is now electrically out of contact or uncoupled from terminal means 32. Additionally, in the moved position of FIG. 3, terminal 46 is electrically out of contact with terminal 48 so that the switch is open and flow of electricity through the switch is thereby prevented.

Movement of movable element 41 from the position of FIG. 3 to the position of FIG. 4 against the gravity biasing force is accomplished preferably by providing magnet means mounted to one of plate 22 and movable element 41. As shown in the drawing, the magnet means is provided by a permanent magnet 44 mounted to movable element 41, and terminal means 32 includes an armature such as a ferromagnetic member 52. Thus, as plate 22 is moved from a position remote of switch means 23, as shown in FIG. 3, to a position proximate switch means 23, as shown in FIG. 4, magnet 44 pulls movable element 41 up into close proximity to armature 52 to make contact between surface 51 and contact member 53 mounted to the end of arm or strip 54. Magnet 44 and armature 52 are not in contact with each other, but the air gap therebetween is small enough to insure that movable element 41 will be maintained in the position of FIG. 4.

The electrical circuit is completed in the plate warming device of the present invention by electrically conductive tubular member 42 which contacts electrically conductive ferromagnetic armature 52 in the first position of FIG. 4. Since negative or ground terminal 36 is electrically connected to armature 52 and flexible conductor 56 is connected to negative terminal 57 and tubular conductor 42, the circuit between conductors 38 and 39 will be complete for the flow of electricity through heater 26 or 26a when movable element 41 is in the first position of FIG. 4.

Automatic control of the temperature of operation of heaters 26 and 26a, as well as positive contact between terminal means 32 and switch means 23 is preferably accomplished by forming cantilevered arm 54 as a bimetallic strip. Bimetallic strip 54 is cantilevered from insulator 58 mounted in terminal housing 59 for movement in a slot 61 (best seen in FIG. 5) in armature 52. Housing 59 preferably holds the strip 54 at a spaced distance from bottom side 62 of plate wall 24 so that arm 54 can move to the phantom line position upon heating of the heating element sufficiently to cause the bimetallic strip to curl away from contact surface 51 on the movable element of the switch. As will be appreciated, armature 52 will hold the movable element in the first position of FIG. 4 notwithstanding movement of arm 54 and contact member 53 to the phantom line position. When contact member 53 no longer is in contact with surface 51, however, the circuit will be broken and electricity will no longer flow to the heating element, permitting the same to cool down. Selection of the bimetallic strip materials, as well as the current in the circuit can be used to control the temperature at which food is heated within a relatively precise range, for example, plus or minus 10 degrees F. Most preferably, the electrical circuit is operated with a 110 volt 0.5 amp power source.

An additional advantage of employing the cantilevered arm, whether or not it is a bimetallic strip, is that the arm is resiliently biased toward engagement with surface 51. It can also extend sufficiently toward the surface to insure positive engagement, with movement of the movable element to the first position of FIG. 4 slightly upwardly displacing arm 54 in each instance. This permits an electrical contact to be achieved, notwithstanding the presence of small pieces of debris on movable member 41 or positioning of the foot 28 of the plate on a piece of debris or uneven surface 31. When arm 54 is a bimetallic strip, it effects both current control and positive resilient engagement with surface 51.

As best may be seen in FIG. 3, it is preferable for movable element 41 to be mounted substantially flush with counter or table surface 31. This enables relatively easy cleaning of surface 31 when plate 22 is removed from the switch. Additionally, it is preferable that the movable element move to a position as shown in FIG. 4 which is above the support surface when contact closing the switch is made. Extension of movable element 41 to a position above the support surface 31 reduces the likelihood of shorting at switch means 23. Any water or milk which might be spilled at the time of eating, when plate 22 is over the switch, must run under annular foot 28 on the plate, at which point it will be exposed only to the negative conductor 42. Positive conductor surface 51 is elevated with respect to support surface 31 making shorting extremely unlikely. Any accidentally spilled liquid would have to enter recess 63 in switch housing member 49 and pass between the switch housing 49 and conductor number 42 beyond the sealing means or O-ring 64 to the bottom end of the switch assembly. Even if fluid reaches the lower end of the switch assembly, it is very difficult for it to bridge between the positive and negative conductors of the switch assembly since gravity will tend to encourage vertical, not lateral, migration. The electrical circuit of the food warmer of the present invention preferably also includes a fuse (not shown) to protect against short circuiting.

As best may be seen in FIG. 3, it is also preferable that contact surface 51 be somewhat recessed from support surface 31 when in the second or open position of the switch. Such recessing of surface 51 means that the upper surface 71 of flange 72 is above surface 51. Thus, if an eating utensil is inadvertently positioned over switch means 23 when it is in the open position, the utensil may be supported on annular surface 71 without contacting recessed surface 51. Such an arrangement reduces the likelihood of shorting or arcing of the switch by an electrically conductive eating utensil. It should also be noted and it is an important feature of the switch assembly of the present invention that in the open or second position of FIG. 3 switch terminals 46 and 48 are not in contact with each other, further making inadvertent shorting between surfaces 51 and 71 unlikely.

It is preferable to provide a washer element formed of an insulating material surrounding surface to further reduce the area of surface 51 and the likelihood of inadvertent shorting. Washer 73 also prevents direct contact between positive terminal contact surface 51 and negative terminal armature 52.

One of the additional advantages of employing magnet means 44 is that plate 22 can be positioned over switch means 23 so that terminal assembly 32 is generally aligned with the switch means. The user can then adjust the plate until the terminal assembly is more closely aligned with switch means 32 and the magnet will be pulled up to armature 52 and separated therefrom only by washer 73 and insulating sleeve 43. Once in close proximity, however, the user can actually feel and hear the magnet being pulled up against terminal assembly 52. The magnetic attraction between magnet 44 and armature 52 further holds the plate in an aligned position with terminal assembly 32. The user, therefore, need not be able to see to align the magnet with the armature; by adjusting the plate, the user can feel when terminal assembly 32 is aligned with the magnet and switch means 23.

It should also be noted that it is preferable when a permanent magnet is employed as magnetic means 44 that electrical conductor 76 extend from terminal member 46 through insulating sleeve 43 to the first or top end of magnet 44 proximate surface 51. The conductor 76 can then be connected at 77 proximate top surface 51 for the flow of electricity through only the top surface. This avoids interference of the electrical current with the magnetic forces of permanent magnet 44.

The food warming assembly of the present invention may be used as a warming unit at the waiter and waitress pick-up or serving counter as well as at the customer's table. FIG. 6 illustrates a pick-up or serving counter, generally designated 81, which typically would act as a divider between the restaurant kitchen and the area from which waiters and waitresses would serve orders to customers. Thus, counter 82 is on the kitchen side of wall 84 and is accessed by the cooks, while counter 83 is on the restaurant or dining room side of wall 84 and is accessed by serving personnel. Mounted to the top of central wall or partition 84 is a serving structure 86.

In the preferred form serving structure 86 is provided by a plurality of compartments 87 each one of which may include a door 88 on the kitchen side and an opening 89 on the dining room side. The food preparation personnel can pivot door 88 down to slide a plate 22 or 22a constructed in accordance with the present invention into a compartment 87. The compartments may be used by all or assigned to a particular waiter or waitress.

Mounted in compartments 87 are switch means 23 constructed as above described and connected to a source of electricity. When plate 22 or 22a is positioned over switch means 23 the heater will be activated and the cook will be able to feel when the switch is aligned with terminal 32 on the plate. If desired, an indicator light (not shown) may be provided on the kitchen side of counter 81 to indicate when the heater is operating.

The walls forming compartments 87, and door 88, which is preferably spring biased to a closed position, help maintain the compartment warm, even though the exhaust fans in most restaurant kitchens tend to pull air from the dining room into the kitchen.

In order to prevent plates 22 from being pushed in too far, a plate stop, such as a transverse rib or slight protrusions 91 from the bottom 92 of compartment 87, may be provided. Protrusions 91 will also help index terminal 32 with switch means 23.

Counter 81 starts the process of heating plate 22 and maintains the food in a heated condition until the serving personnel reach through opening 89 and slide or lift the plate over protrusions 91. The waiter or waitress then may take the plate to the customer's table and place the plate on another switch means 32 for consumption of the food while it is maintained in a warmed condition. Counter 81 significantly reduces the energy required to maintain the food in a heated condition while waiting to be served as compared to heat lamps and similar conventional warming apparatus.

What is claimed is:

1. A food warming device comprising:
    plate means having an electrical resistance heating element mounted thereto, said heating element being coupled to terminal means carried by said plate means, and
    an electrical switch means coupled to a source of electricity and mounted proximate a support surface for communication of electricity to said heating element when said plate means is positioned on said support surface proximate said switch means;
    said switch means including a movable element mounted for movement between:
    (i) a first position electrically coupling said switch means to said terminal means and substantially simultaneously closing said switch means for the flow of electricity to said heating element, and
    (ii) a second position electrically uncoupling said switch means from said terminal means and substantially simultaneously opening said switch means to prevent the flow of electricity therethrough,
    said movable element being biased toward said second position; and
    magnet means including a magnet and an armature with one of said magnet and said armature mounted to said plate means and a remainder of said magnet and said armature mounted to said movable element, said magnet means displacing said movable element against the biasing force from said second position to said first position when said plate means is placed on said support surface proximate said switch means.

2. The food warming device as defined in claim 1, and current control means carried by one of said plate means and said switch means and regulating the flow of current to said heating element when said movable element is in said first position to automatically control the heat generated by said heating element.

3. The food warming device as defined in claim 2 wherein,
    said control means is provided by a bimetallic strip cantilever mounted to said terminal means and having a distal end formed to contact and be resiliently displaced by said movable element when said movable element is in said first position.

4. The food warming device as defined in claim 1 wherein,
    said support surface is a horizontally extending surface,
    said switch means is mounted in said support surface and moves to a position above said support surface when in said first position, and
    said magnet is mounted to said terminal means and said armature is mounted to said plate means.

5. The food warming device as defined in claim 4 wherein,
    said armature is mounted proximate said terminal means, and
    said terminal means includes a positive terminal and a negative terminal with at least one of said positive terminal and said negative terminal being movably mounted to said plate means and resiliently biased toward contact with said movable element when in said first position.

6. The food warming device as defined in claim 5 wherein,
    the movably mounted of said positive terminal and said negative terminal is provided by a cantilever mounted bimetallic strip.

7. The food warming device as defined in claim 4 wherein,
    said movable element is gravity biased to a second position substantially flush with said support surface.

8. The food warming device as defined in claim 1 wherein,
    said movable element is formed with a first end having an electrically conductive contact surface positioned for electrical contact with said terminal means when said movable element is in said first position, and a second end remote of said first end having a first switch terminal carried thereby, said switch terminal and said contact surface being connected by electrical conductor means, and said switch means further including a second switch terminal mounted to a stationary position of said switch means and electrically connected to said source of electricity, said second switch terminal being positioned for contact with said first switch terminal when said movable element is in said first position and being positioned to be out of contact with said first switch terminal when said switch means is in said second position.

9. The food warming device as defined in claim 8 wherein,
    one of said first switch terminal and said second switch terminal is movably mounted and resiliently biased toward a remainder of said first switch terminal and said second switch terminal.

10. The food warming device as defined in claim 8 wherein,
    said support surface is horizontally extending,
    said switch means is mounted in said horizontal surface with said contact surface substantially flush with said horizontal surface in said second position and said first switch terminal and said second switch terminal recessed below said support surface in both said first position and said second position.

11. The food warming device as defined in claim 10 wherein,
    said switch means includes seal means mounted proximate said movable element and in sealed relation thereto to resist the migration of fluids from said support surface to said first switch terminal and said second switch terminal.

12. The food warming device as defined in claim 11 wherein,
    said switch means is formed with a recess therein surrounding said movable element, and
    said movable element includes a laterally extending flange dimensioned to be received in said recess when said movable element is in said second position.

13. The food warming device as defined in claim 1 wherein,
    said movable element is mounted for movement along a substantially vertically oriented axis and includes substantially horizontally oriented positive contact surface and negative contact surface which are electrically insulated from each other and positioned for contact with corresponding positive and negative surfaces on said terminal means when said movable element is in said first position.

14. The food warming device as defined in claim 13 wherein,
at least one of said positive contact surface and said negative contact surface is positioned in recessed relation to said support surface in said second position.

15. The food warming device as defined in claim 1 wherein,
said magnet is a permanent magnet mounted to said movable element and said armature is a ferromagnetic member mounted to said terminal means.

16. The food warming device as defined in claim 15 wherein,
a surface of said permanent magnet facing said plate means provides one electrical contact with said terminal means, and
said switch means includes electrical conductor means coupled to said surface of said permanent magnet and electrically insulated with respect to a remainder of said permanent magnet.

17. The food warming device as defined in claim 1 wherein,
said heating element is removably mounted to said plate means and is formed for remounting to another plate means.

18. The food warming device as defined in claim 17 wherein,
said heating element is an etched-foil resistance heating sheet having a pressure-sensitive adhesive on a side thereof contacting said plate means.

19. The food warming device as defined in claim 1 wherein,
said switch means includes a plurality of similarly formed switches mounted in side-by-side spaced apart relation along a serving counter to provide a plurality of sites at which said plate means may be positioned to turn on said heating element.

20. The food warming device as defined in claim 19 wherein,
said counter includes walls defining compartments around said switches dimensioned to receive said plate means therein, and said counter further includes a movable door means defining said compartments with said walls and providing selective access to said compartments.

* * * * *